United States Patent
Dockweiler et al.

(10) Patent No.: US 9,221,323 B2
(45) Date of Patent: Dec. 29, 2015

(54) SEALING DEVICE AND METHOD FOR AN OPENING IN THE SHELL OF A FLAP, IN PARTICULAR A TAILGATE OF A MOTOR VEHICLE

(71) Applicant: Bayerische Motoren Werke Aktiengesellschaft, Munich (DE)

(72) Inventors: Achim Dockweiler, Munich (DE); Markus Rottelberger, Altdorf (DE); Harald Lathwesen, Mauern (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/229,005

(22) Filed: Mar. 28, 2014

(65) Prior Publication Data

US 2014/0203586 A1     Jul. 24, 2014

Related U.S. Application Data

(63) Continuation of application No. PCT/EP2012/068545, filed on Sep. 20, 2012.

Foreign Application Priority Data

Sep. 30, 2011 (DE) .......................... 10 2011 083 932

(51) Int. Cl.
   *B62D 25/10*    (2006.01)
   *B60J 10/00*    (2006.01)
   (Continued)

(52) U.S. Cl.
   CPC ...... *B60J 10/00* (2013.01); *B60J 5/107* (2013.01); *B60J 10/08* (2013.01); *Y10T 29/49622* (2015.01)

(58) Field of Classification Search
   CPC ............ B60J 5/107; B60J 5/101; B60J 10/00; B60J 10/08; B05C 5/0212; C09J 5/06; C09J 2400/163
   USPC ................. 286/146.5, 193.11, 50; 229/190; 52/309.4, 239, 592.1, 480, 481.2; 160/135, 351; 206/434
   See application file for complete search history.

(56) References Cited

U.S. PATENT DOCUMENTS 5,730,446 A  *  3/1998  Taylor et al. .................. 277/312
6,000,118 A  *  12/1999  Biernat et al. ................. 29/458

(Continued)

FOREIGN PATENT DOCUMENTS

DE      197 48 786 A1    5/1999
DE      102 23 329 A1    12/2003

(Continued)

OTHER PUBLICATIONS

International Search Report with English translation dated Dec. 3, 2012 (5 pages).

(Continued)

*Primary Examiner* — Glenn Dayoan
*Assistant Examiner* — Sunsurraye Westbrook
(74) *Attorney, Agent, or Firm* — Crowell & Moring LLP

(57) ABSTRACT

A seal is provided for a body shell opening of a flap, particularly a tailgate of a motor vehicle. The flap has an exterior flap wall with at least two exterior wall parts, which, on facing circumferential wall areas, each have one edge area angled inwardly, which are mutually connected. The flap has an interior flap wall with at least one interior wall part. The interior wall part is connected at a distance from the angled edge areas of the exterior wall parts with at least one circumferential area of the exterior flap wall and, in the area of the angled edge areas of the exterior wall parts, forms a gap together with the exterior flap wall. Before connecting the exterior flap wall with the interior flap wall, a gap filler piece is moved into a closed position, which, after the connection alone or together with a gap sealant, seals off the gap.

16 Claims, 1 Drawing Sheet

(51) Int. Cl.
*B60J 10/08* (2006.01)
*B60J 5/10* (2006.01)

(56) References Cited

U.S. PATENT DOCUMENTS

| | | |
|---|---|---|
| 6,478,915 B1 | 11/2002 | Schmalbruch et al. |
| 6,749,254 B1 * | 6/2004 | Kleven et al. ............... 296/191 |
| 7,007,368 B2 * | 3/2006 | Sovoda ........................ 29/509 |
| 7,241,073 B2 * | 7/2007 | Miller et al. ................ 403/278 |
| 8,087,720 B2 * | 1/2012 | Wang ....................... 296/193.11 |
| 8,602,482 B2 * | 12/2013 | Song et al. ................. 296/146.5 |

FOREIGN PATENT DOCUMENTS

| | | |
|---|---|---|
| DE | 10 2008 032 777 A1 | 3/2009 |
| EP | 1 041 130 A2 | 10/2000 |
| WO | WO 2009/071269 A1 | 6/2009 |

OTHER PUBLICATIONS

German Search Report with partial English translation dated Jun. 22, 2012 (10 pages).

* cited by examiner

SEALING DEVICE AND METHOD FOR AN OPENING IN THE SHELL OF A FLAP, IN PARTICULAR A TAILGATE OF A MOTOR VEHICLE

CROSS REFERENCE TO RELATED APPLICATIONS

This application is a continuation of PCT International Application No. PCT/EP2012/068545, filed Sep. 20, 2012, which claims priority under 35 U.S.C. §119 from German Patent Application No. 10 2011 083 932.1, filed Sep. 30, 2011, the entire disclosures of which are herein expressly incorporated by reference.

BACKGROUND AND SUMMARY OF THE INVENTION

The invention relates to a sealing device and method for a body shell opening of a flap, particularly a rear tailgate of a motor vehicle.

In the case of all known motor vehicles, where the exterior flap wall of a rear flap has at least one upper and one lower exterior wall part which, on facing circumferential wall areas, in the area of a horizontal point of separation arranged approximately in the transverse direction of the vehicle, have edge areas, which are angled into the interior of the rear flap and are connected with one another, as a result of a fold, which is formed by the angled edge areas, between the exterior wall parts of the exterior flap wall and an interior flap wall to be connected with the exterior flap wall, gaps are in each case formed laterally between the exterior flap wall and the interior flap wall. These gaps are sealed in a costly and partly insufficient manner.

According to the state of the art, it is, for example, being attempted to close or seal the gaps by a PVC flanged fold sealing. The flanged fold sealing is highly fluid and can close or seal gaps at most up to a size of approximately 1.5 mm. Larger gaps cannot be closed off in a waterproof manner by use of the PVC flanged fold sealing so that, in this case, moisture can penetrate by way of the gaps into the interior of the rear flap and may cause corrosion at the rear flap. Another attempt to close or seal off the gap according to the state of the art provides, after a catalytic immersion coating of the rear flap, that PVC is laboriously filled into the lateral gap of the rear flap more or less skillfully and at high expenditures of time and cost. As a result of the extra manual labor, the manufacturing of the rear flap is not reliable and prevents a fully automatic production of the rear flap.

It is an object of the invention to provide a sealing device for a body shell opening of a flap, particularly a rear tailgate of a motor vehicle, which permits a reliable fully automatic production of the flap and can thereby also reliably close off in a waterproof manner a larger gap between the exterior flap wall and the interior flap wall in the area of the angled edges areas of the two exterior wall parts of the exterior flap wall.

This and other objects are achieved by a sealing device for a body shell opening of a flap, particularly a rear tailgate of a motor vehicle. The flap has an exterior flap wall with at least two exterior wall parts which, on facing circumferential wall areas, each have one edge area angled toward the interior. These inwardly angled edge areas are mutually connected, for example, by laser welding. The flap has an interior flap wall, which has at least one interior wall part, that is connected with at least one circumferential area of the exterior flap wall at a distance from the angled edge areas of the exterior wall parts. The interior flap wall, in the area of the angled edge areas of the exterior wall parts, forms a gap together with the exterior flap wall. Before the connecting of the exterior flap wall with the interior wall part, a gap filler piece is inserted into the gap. After the connecting of the exterior flap wall with the interior flap wall, the gap filler piece seals the gap alone or together with a gap sealant. It is a significant advantage of the invention that the corresponding gap is closed, or at least largely reduced, by the gap filler piece such that the gap filler piece alone or at least together with a gap sealant, which at most can seal smaller gaps, can seal off the gap in a waterproof manner. In a fully automatic process, before connecting the exterior flap wall with the interior flap wall, the gap filler piece can be gripped by a gripper and can be positioned, for example, by being fitted onto an area of the exterior flap wall or the interior flap wall. Possibly by using an automatically applied gap sealant, for example, a PVC flanged fold sealing, the corresponding gap is closed and sealed in a waterproof manner after connecting the exterior flap wall with the interior flap wall.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
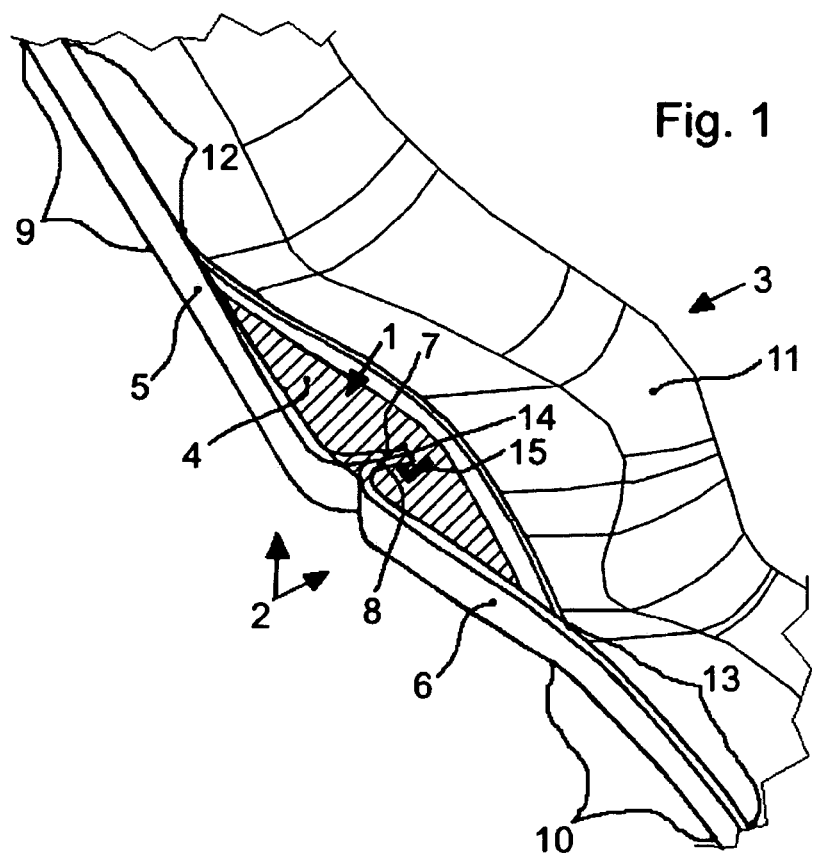
FIG. 1 is a perspective view of a lateral gap of a rear flap of a motor vehicle, into which a gap filler piece is inserted.

FIG. 1 is a perspective enlarged and simplified view of a lateral gap 1 between an upper exterior flap wall 2 and a lower interior flap wall 3 of a rear flap of a motor vehicle, which gap 1 is necessarily formed in the case of the body shell of the rear flap. The gap 1 is closed in a waterproof manner by a gap filler piece 4 of a sealing device, which is shown in a hatched manner in FIG. 1.

The exterior flap wall 2 has two exterior wall parts 5, 6 which, on facing circumferential wall areas, each have an edge area 7, 8 angled inwardly toward the interior of the rear flap. These edge areas 7, 8 are mutually connected, for example, by laser welding, and form an essentially approximately horizontal parting line extending in the transverse direction of the motor vehicle.

At a distance from the angled edge areas 7, 8 of the exterior wall parts 5, 6, the exterior flap wall 2 is connected in a respectively assigned circumferential area 9, 10 of the exterior wall parts 5, 6 with an interior wall part 11 of the interior flap wall 3, in which case, in the embodiment, the interior wall part 11 is formed on a circumferential area 12, 13 adjoining the respective circumferential wall area 9, 10 of the exterior flap wall 2, at least in areas, angled in the same direction as the exterior wall parts 5, 6.

It can be recognized in FIG. 1 that, due to the edge areas 7, 8 of the exterior wall parts 5, 6 angled in the area of the parting line, the exterior wall parts 5, 6 can not be laterally connected with the interior wall part 11 on facing circumferential wall areas 9, 10, in such a manner that no lateral gap 1 would be formed between the exterior wall parts 5, 6 and the interior wall part 11.

Figure 2:
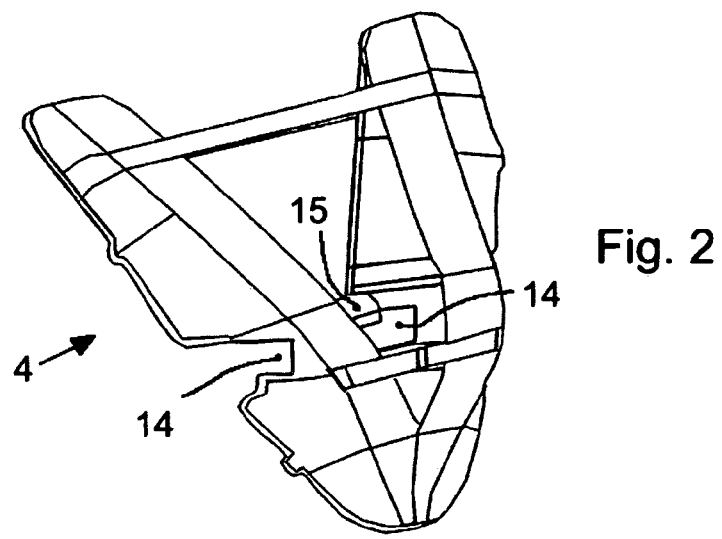
FIG. 2 is a perspective view of the gap filler piece.

In order to close this gap 1 in a waterproof manner, which gap 1 has a width of, for example, maximally 8 mm, the gap filler piece 4 is provided, which is illustrated in FIG. 1 in a simplified hatched manner and is shown in FIG. 2 in a more detailed perspective view.

Before connecting the exterior flap wall 2 with the interior flap wall 3, the gap filler piece 4 can be automatically moved, for example, by a gripper into a closed position, in which, after connecting the exterior flap wall 2 with the interior flap wall 3, the gap filler piece 4, alone or together with a gap sealant (not shown), closes and seals the gap 1 in a completely waterproof manner.

Before connecting the exterior flap wall 2 with the interior flap wall 3, the gap filler piece 4 provided for closing the gap 1 is moved into a closed position suitable for closing the gap 1 and is connected with the exterior flap wall 2 (or at least an exterior wall part 5, 6) or with the interior wall part 11 of the interior flap wall 2. In this case, before connecting the exterior flap wall 2 with the interior wall part 11, the gap filler piece 4 may be snap-fitted or tightly clamped, for example, on the exterior flap wall 2 or on the interior wall part 11.

For this purpose, it is provided in the embodiment that the gap filler piece 4 moved into the closed-off position has a central fastening groove 14 which, before the connecting of the exterior flap wall 2 with the interior wall part 11, is fitted onto the inwardly angled edge areas 7, 8 of the two exterior wall parts 5, 6. As a result, the gap filler piece 4 is moved into the closed-off position in which a flexible tongue 15 projecting from the gap filler piece 4, interacting with an angled edge area 8 of a facing exterior wall part 6, loads the lateral area of the fastening groove 14 of the gap filler piece 4 against an angled edge area 7 of the other exterior wall part 5 and thereby fixedly clamps or sufficiently tightly holds the gap filler piece 4 on the angled edge areas 7, 8 of the exterior wall parts 5, 6.

Before, during, or after the connecting of the exterior flap wall 2 with the interior flap wall 3, the gap filler piece 4 may be flowably heated at least for a short time such that the gap filler part 4 plastically deforms at least during the connecting of the exterior flap wall 2 with the interior flap wall 3 and, in the process, adapts itself to the gap. After the connecting of the exterior flap wall 2 with the interior flap wall 3, the gap filler piece 4 closes the gap 1 at least largely and, alone or together with a gap sealant (not shown), seals off the gap 1 in a waterproof manner.

The gap filler piece 4 may, for example, be an injection-molded part made of a two-component plastic material which, on its area facing the circumferential area of the gap 1, has a material component that is softer than its body and that, after a connecting of the exterior flap wall 2 with the interior flap wall 3, alone or in connection with an additional gap sealant, rests in a waterproof manner on a circumferential area of the gap 1.

When using a gap sealant in addition to the gap filler piece 4, the gap sealant may, for example be a PVC flanged fold sealing.

It is recognized in FIG. 2 that, in the embodiment, the gap filler piece 4 has a side-symmetrical construction, in which case, the gap filler piece 4, by way of its left side area, fills the left gap illustrated in FIG. 1 and, by way of its right side area illustrated in FIG. 2, fills the right gap of the rear flap (which is not recognizable in FIG. 1). The gap filler piece 4 fills the right gap in the same manner as indicated with respect to the left gap 1 and, at least largely alone, or together with a gap sealant, completely seals off the right gap in a waterproof manner.

The invention can naturally be constructed in a manner that deviates from the single embodiment shown. The two exterior wall parts of the exterior flap wall can be mutually connected at the facing circumferential wall areas, on which the exterior walls parts each have an inwardly angled edge area, in an arbitrary manner, for example, by laser welding. The interior flap wall may also have more than one interior wall part. The gap filler piece can be moved in an arbitrary manner into the closed position and can be fixedly held there before the connecting of the exterior flap wall with the internal flap wall. For example, in its closed position, before the connecting of the exterior flap wall with the interior flap wall, the gap filler piece is connected with the exterior flap wall or with the interior flap wall in a fixed or detachable manner. In its closed position, the gap filler piece can be snap-fitted or fixedly clamped to the interior wall part of the interior flap wall or on at least one exterior wall part of the exterior flap wall. The gap filler piece may have at least one fastening groove which, in the closed position of the gap filler piece, is fitted onto at least one inwardly angled edge area of an exterior wall part. For example, in this case, a flexible tongue projecting from the gap filler piece, interacting with an angled edge area of an exterior wall part, can load a lateral area of the fastening groove of the gap filler piece against an angled edge area of an exterior wall part and thereby fixedly clamp or sufficiently tightly hold the gap filler piece on the angled edge areas of the exterior wall parts.

In addition to the gap filler piece, an arbitrary gap sealant may be used which, after the connecting of the exterior flap wall with the interior flap wall, together with the gap filler piece, seals off the corresponding gap preferably in a waterproof manner. Only as an example, the gap sealant may be a PVC flanged fold sealing.

The flap may be any arbitrary flap, for example, a rear tailgate of a motor vehicle.

Although it is advantageous, it is not absolutely necessary that the gap filler piece has a side-symmetrical construction and, by means of a left side area, fills a left gap and, by means of a right side area, fills a right gap of the flap at least largely and closes it alone or together with a gap sealant and seals it off in a waterproof manner. Likewise, in the case of several gaps, a separate gap filler piece can be assigned to each gap. However, this increases storage and requires measures which ensure that the correct gap filler piece is provided for each gap. In the case of two gaps to be sealed off, which have a comparable, but only side-reversed shape, a common side-symmetrically constructed gap filler piece is preferably used, which, in one area, is adapted to one gap and, in another area, is adapted to the other gap. Such a gap filler piece is used in the embodiment here and has a single central common fastening groove, which, in each case, can be fitted at an assigned, for example, left and right point, onto jointly angled edge areas of the two exterior wall parts. For example, a single elastic spring-type tongue assigned to the fastening groove can fixedly clamp the gap filler piece on the common angled edge areas of the exterior wall parts. The sealing device for a body shell opening of a flap permits a reliable fully automatic manufacturing of the flap as well as a fully automatic waterproof closing-off of the gap of the flap.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A flap of a motor vehicle, comprising:
an exterior flap wall having at least two exterior wall parts which respectively have on facing circumferential wall areas an inwardly angled-away peripheral area, outer facing sides of the peripheral areas being connected to one another;

an interior flap wall with at least one interior wall part, the interior flap wall being connected at a distance from the angled-away peripheral areas of the exterior wall parts to at least one circumferential area of the exterior flap wall, wherein the interior flap wall forms a gap with the exterior flap wall in an area of the angled-away peripheral areas of the exterior wall parts; and a gap filler piece arranged, in a closed position, to seal the gap, wherein the gap filler piece is moved into the closed position before connecting the exterior flap wall with the interior flap wall and, after connecting the exterior flap wall with the interior flap wall, the gap filler piece seals the gap alone or with a gap sealant.

2. The flap according to claim 1, wherein the gap filler piece, in the closed position, is fastened to at least one of the exterior wall parts of the exterior flap wall or to the interior wall part of the interior flap wall before the exterior flap wall is connected with the interior flap wall.

3. The flap according to claim 2, wherein the gap filler piece comprises a snap-fit or fixed clamp connection so as to be snap-fit or fixedly clamped to the interior wall part or to at least one of the exterior wall parts in the closed position.

4. The flap according to claim 1, wherein the gap filler piece comprises:

a fastening groove which, in the closed position, fits onto the inwardly angled-away peripheral areas of the two exterior wall parts.

5. The flap according to claim 4, wherein the gap filler piece further comprises:

a flexible tongue projecting from the gap filler piece and interacting with the inwardly angled peripheral area of one of the exterior wall parts in order to load a lateral area of the fastening groove against another inwardly angled peripheral area of the other exterior wall part, whereby the gap filler piece is clamped onto the inwardly angled peripheral areas of the exterior wall parts.

6. The flap according to claim 5, wherein the gap filler piece is formed of a flowable material so as to deform during the connecting of the exterior flap wall to the interior flap wall, whereby heating of the gap filler piece during or after the connecting of the exterior flap wall to the interior flap wall allows for the deformation in order to seal the gap.

7. The flap according claim 1, wherein the gap filler piece in an injection-molded part formed of a two-component plastic material which, on an area facing a circumferential area of the gap, is of a material softer than a body material of the gap filler piece, which softer material adapts to the circumferential area of the gap.

8. The flap according claim 6, wherein the gap filler piece in an injection-molded part formed of a two-component plastic material which, on an area facing a circumferential area of the gap, is of a material softer than a body material of the gap filler piece, which softer material adapts to the circumferential area of the gap.

9. The flap according to claim 1, wherein the gap sealant is a PVC flanged fold seal.

10. The flap according to claim 1, wherein the flap is a tailgate of a motor vehicle.

11. The flap according to claim 1, wherein the two exterior wall parts are connected on an approximately horizontal parting line extending in a transverse direction of the vehicle such that a left gap and a right gap are formed, respectively, on lateral side areas of the flap.

12. The flap according to claim 11, wherein the gap filler piece comprises a side-symmetrical body, whereby a left side of the body seals off the left side gap of the flap, and a right side of a further identical gap filler piece seals off the right side of the flap.

13. A method of sealing a gap in an opening in a shell of a flap, the flap comprising an exterior flap wall with two exterior wall parts which respectively have on facing circumferential wall areas an inwardly-angled peripheral area, outer facing sides of the peripheral areas being connected with one another, the flap further having an interior flap wall with an interior wall part, the interior flap wall being connected at a distance from the inwardly-angled peripheral areas of the exterior wall parts with a circumferential area of the exterior flap wall so as to form the gap in an area of the inwardly-angled peripheral areas, the method comprising the acts of:

before connecting the exterior flap wall with the interior flap wall, moving a gap filler piece into a position that closes the gap; and upon connecting the exterior flap wall with the interior flap wall, sealing the gap with the gap filler piece either by the gap filler piece alone or additionally with a gap sealant.

14. The method according to claim 13, wherein the gap filler piece is fastened to at least one of the exterior wall parts of the exterior flap wall or to the interior wall part of the interior flap wall before connecting the exterior flap wall to the interior flap wall.

15. The method according to claim 14, wherein the fastening of the gap filler piece comprises a snap-fitting or fixed clamping of the gap filler piece to the interior wall part or to at least one of the exterior wall parts.

16. The method according to claim 15, wherein during or after connecting the exterior flap wall to the interior flap wall, flowably heating the gap filler piece at least for a short duration, such that the gap filler piece deforms during the connecting of the exterior flap wall to the interior flap wall in order to seal the gap after the connecting of the exterior flap wall to the interior flap wall.

* * * * *